(No Model.)
C. W. BILDT.
APPARATUS FOR TREATING WIRE RODS.
No. 526,433. Patented Sept. 25, 1894.
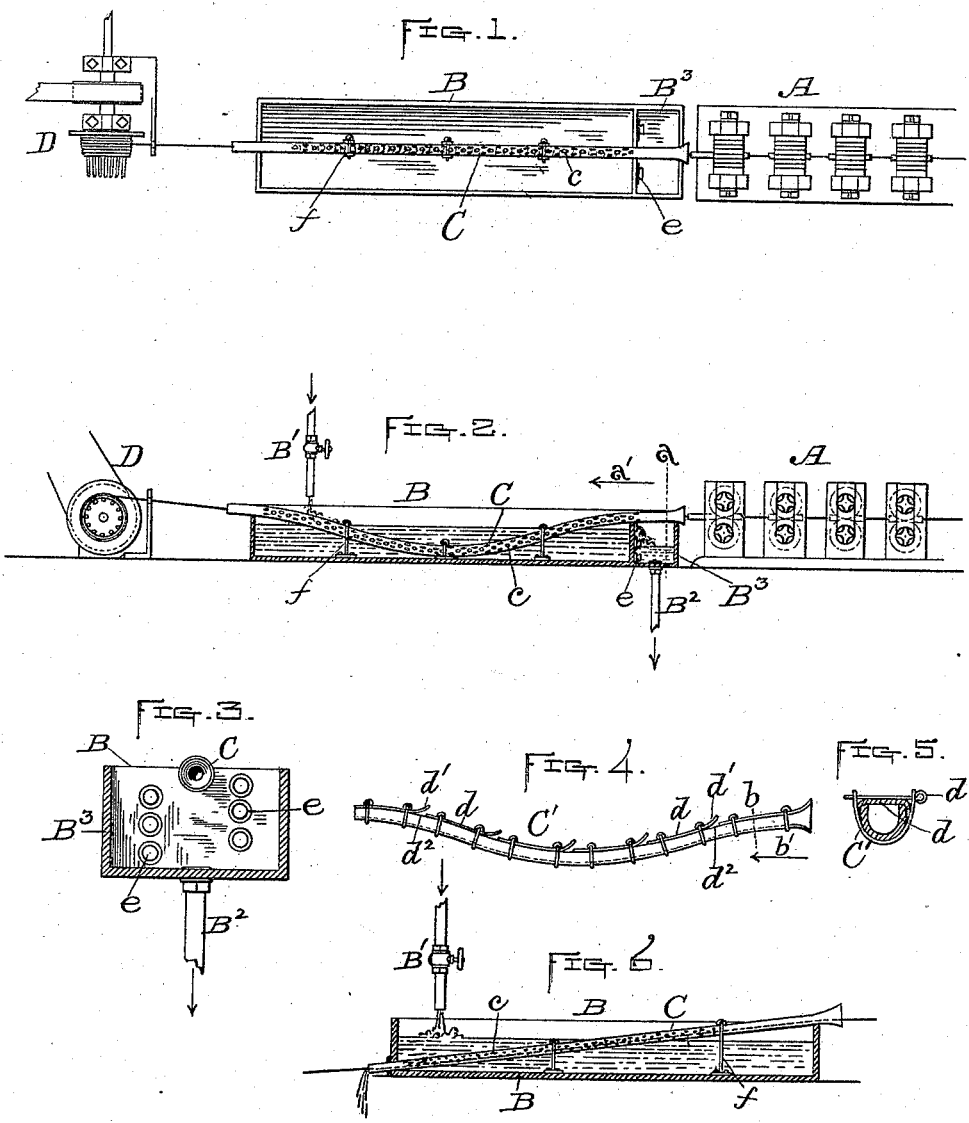
Witnesses:
Walter B. Nourse.
C. Forrest Wesson.
Inventor:
Carl Wilhelm Bildt.
By A. A. Barker, Att'y.

UNITED STATES PATENT OFFICE.

CARL WILHELM BILDT, OF WORCESTER, MASSACHUSETTS.

APPARATUS FOR TREATING WIRE RODS.

SPECIFICATION forming part of Letters Patent No. 526,433, dated September 25, 1894.

Application filed February 13, 1894. Serial No. 500,051. (No model.)

*To all whom it may concern:*

Be it known that I, CARL WILHELM BILDT, of the city and county of Worcester and State of Massachusetts, have invented certain new and useful Improvements in Apparatuses for Treating Wire Rods; and I do hereby declare that the following is a full, clear, and exact description thereof, reference being had to the accompanying drawings, forming a part of this specification, and in which—

Figure 1 represents a plan of my improved apparatus, combined with part of a wire-rod rolling-mill and its reel. Fig. 2 is a side view thereof, partly in section. Fig. 3 represents upon an enlarged scale, a transverse section on line $a$, Fig. 2, looking in the direction of arrow $a'$. Fig. 4 shows a modification in the construction of the wire-rod conducting-pipe, hereinafter described. Fig. 5 is an enlarged, transverse section thereof, taken on line $b$ Fig. 4, looking in the direction of arrow $b'$. Fig. 6 is a similar view to that shown in Fig. 2, of the tank and conducting-tube, showing a straight, instead of a curved tube, as in said Fig. 2.

My invention relates to improvements in apparatuses for carrying out the process of treating wire rods set forth in my United States Patent No. 459,903, dated September 22, 1891, viz:—of subjecting said rods to a bath of water after leaving the rolling-mill, and prior to being reeled; and consists of certain improvements in the means employed for subjecting the rods to said water bath, and for conducting the same therethrough from the rolling-mill to the reel upon which they are coiled, as hereinafter more fully set forth.

To enable others skilled in the art to which my invention appertains, to better understand the nature and purpose thereof, I will now proceed to describe it more in detail.

The purpose and advantages of subjecting the rods to a water bath after leaving the rolling-mill, and prior to reeling, are fully stated in my former patent, previously referred to, and therefore only a brief explanation thereof will be necessary in the present instance, to make clear the purpose and advantages of my improved apparatus.

The old method of reeling the rods from the rolling-mill and allowing them to cool slowly while in a coiled state, causes much scaling through oxidation, and consequently, produces rough surfaces and "pits." Said method also causes the rods to cool unevenly, the disadvantages of which are well understood, and therefore need not be herein set forth.

By my improved process of passing said rods through a bath of water as they leave the rolling-mill, and thereby suddenly cooling the same prior to reeling, crystallization is reduced or removed by the contraction and hardening thereof, to a certain degree, and a corresponding degree of toughness is imparted thereto. Said cooling process also retards or arrests the formation of surface scales upon the rods, and the contraction of the metal also causes such surface scales as have already been formed to be loosened and washed off in passing through the water, thus leaving the rods comparatively clean and with a smooth surface; consequently requiring but little acid to properly clean the same preparatory to further treatment. I find in practice that rods subjected to said treatment are left comparatively smooth and clean, and require only a weak solution of acid to further clean them sufficiently for the coating of copper, tin or zinc to readily and perfectly adhere thereto. I also find in practice that superior finished wire may be produced in one draft from rods thus treated.

My improved apparatus for carrying out said process is constructed and arranged as follows:

Referring to the drawings, A represents part of a rolling-mill; B, the water tank, provided with the supply and discharge pipes, B' and B², respectively, and also with means for regulating the amount of water contained therein, as and for the purpose hereinafter described; C, a pipe or tube arranged longitudinally in said tank for guiding the rods through the water contained therein, and D the usual reel upon which said rods are coiled as fast as delivered from the rolling-mill, and subjected to said water bath. Any suitable conducting pipe or tube or similar guide may be used whereby water may be supplied to the interior thereof, for the rods to pass through, as they are conducted from the rolling-mill to the reel.

In Figs. 1, 2 and 6 I have shown a conducting tube provided with numerous, small, transverse openings or perforations $c$ through which the water may enter; while in Figs. 4 and 5 a trough $C'$ is shown, having a series of removable covers $d$, each turned up a little at their rear ends, as indicated at $d'$, leaving an opening $d^2$ between one cover and the next one adjoining through which the water may enter. By the latter construction the rod may be reached if required at any point by withdrawing the holding-pins $d^3$ and removing one or more of said covers $d$.

In this instance I have shown only one conducting-tube C combined with the water-tank B, but it will be understood that in practice several tubes may be used for treating a number of rods at the same time. Said tube may be curved in the form of a bow, as shown in Figs. 2 and 4, and arranged so that its central part will come near the bottom of the center of the tank and its ends over the ends thereof as is shown in Figs 1 and 2, or it may be made straight and extended diagonally from the top of one end of the tank to the bottom of its other end as is shown in Fig. 6. By thus bringing part of said tube below the surface of the water contained in said tank, a greater or less portion of its length will, of course, be submerged, according to the depth of said water, which depth may be regulated by means of suitable plugged outlets $e$, arranged one above the other at one end of the tank, as is shown in Figs. 2 and 3, or by varying the size of the perforations and supply pipe so as to keep the desired body of water in the tank as shown in Fig. 6. In said figure as will be observed, the discharge is made from the tank through the perforations into the pipe or tube, and thence down and out through its lower end. By thus constructing and arranging the tubes it is obvious that the duration of the submersion of the rods may be varied as desired—the deeper the water is in the tank, the longer will be said submersion and vice versa. In this manner the degree of hardness of the rods may be regulated to a nicety to produce the desired quality of rods.

The tubes are fastened in position at convenient points in their length, as indicated at $f$, and for convenience in construction when curved tubes are used, a small auxiliary tank $B^3$ is arranged at the end of tank B to receive the discharge from said tank C, through the aforesaid outlets $e$—the discharge pipe $B^2$ for carrying off the waste being connected with said auxiliary tank, as is shown in Figs. 2 and 3.

Having described said invention, what I claim therein as new, and desire to secure by Letters Patent, is—

An apparatus for treating wire-rods, comprising in combination a wire-rod rolling-mill, its reel, a water-tank interposed between the two, provided with suitable means for supplying water thereto, for discharging the water therefrom, and for regulating the depth of water therein, and a perforated or open pipe or guide arranged and fastened longitudinally in the tank, with a portion thereof passing through the water bath of said tank, substantially as and for the purpose set forth.

CARL WILHELM BILDT.

Witnesses:
A. A. BARKER,
W. B. NOURSE.